United States Patent
Spiotta et al.

(10) Patent No.: US 10,827,362 B2
(45) Date of Patent: Nov. 3, 2020

(54) METHOD FOR DETECTION OF WIRELESS BROADBAND COVERAGE HOLES

(71) Applicant: Nokia Solutions and Networks Oy, Espoo (FI)

(72) Inventors: Mark Spiotta, Wheaton, IL (US); Michal Dudek, Cracow (PL); Wojciech Gazda, Cracow (PL); Dariusz Palka, Cracow (PL); Przemyslaw Jackowiak, Cracow (PL); Artur Poplawski, Cracow (PL); Agnieszka Daniecka-Laba, Cracow (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/634,319

(22) PCT Filed: Jul. 28, 2017

(86) PCT No.: PCT/US2017/044324
§ 371 (c)(1),
(2) Date: Jan. 27, 2020

(87) PCT Pub. No.: WO2019/022756
PCT Pub. Date: Jan. 31, 2019

(65) Prior Publication Data
US 2020/0236559 A1    Jul. 23, 2020

(51) Int. Cl.
*H04W 16/18* (2009.01)
*H04W 64/00* (2009.01)
*H04W 24/08* (2009.01)
*H04W 24/02* (2009.01)

(52) U.S. Cl.
CPC ........... *H04W 16/18* (2013.01); *H04W 24/02* (2013.01); *H04W 24/08* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 9,078,160 B2 * | 7/2015 | Faerber | ................. H04W 24/08 |
| 9,549,358 B1 | 1/2017 | Ho et al. | |
| 2009/0156223 A1 | 6/2009 | Krishnaswamy et al. | |
| 2012/0088498 A1 | 4/2012 | Xiao et al. | |
| 2012/0127876 A1 | 5/2012 | Hunukumbure et al. | |
| 2013/0084862 A1 | 4/2013 | Zou et al. | |
| 2013/0115950 A1 * | 5/2013 | Kawasaki | ....... H04W 36/00835 455/436 |

(Continued)

OTHER PUBLICATIONS

International Search Report and Written Opinion received for corresponding Patent Cooperation Treaty Application No. PCT/US2017/044324, dated Oct. 5, 2017, 9 pages.

*Primary Examiner* — German Viana Di Prisco
(74) *Attorney, Agent, or Firm* — Nokia Technologies Oy

(57) ABSTRACT

An apparatus and method that may determine, at a network entity, a first distance between a first base station and a second base station based on a handover indication received from user equipment. The method may further determine, by the network entity, a second distance between a point of signal loss and a point of signal acquisition of user equipment. The method may further estimate, by the network entity, one or more network coverage areas based upon the first distance and the second distance.

20 Claims, 5 Drawing Sheets

(56) References Cited

U.S. PATENT DOCUMENTS

| | | | | |
|---|---|---|---|---|
| 2013/0267257 A1* | 10/2013 | Palanki | ............... | H04W 64/003 455/456.5 |
| 2014/0071856 A1* | 3/2014 | Brisebois | .............. | H04W 56/00 370/255 |
| 2015/0038144 A1* | 2/2015 | Ahlstrom | .............. | H04W 24/02 455/436 |
| 2015/0334625 A1 | 11/2015 | Banks et al. | | |

\* cited by examiner

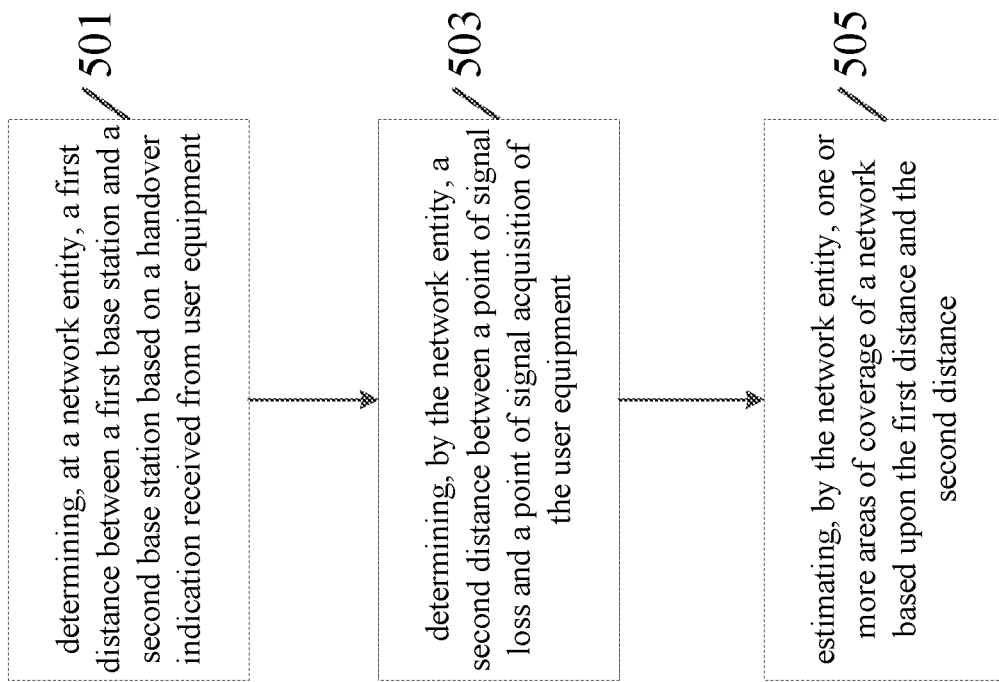

METHOD FOR DETECTION OF WIRELESS BROADBAND COVERAGE HOLES

RELATED APPLICATION

This application was originally filed as Patent Cooperation Treaty Application No. PCT/US2017/044324 filed Jul. 28, 2017.

BACKGROUND

Field

Certain embodiments may relate to communication systems, and, for example, some embodiments may relate to wireless broadband data networks including fixed network infrastructure, radio access equipment, and portable end user equipment.

Description of the Related Art

In a communication system, such as a Long-Term Evolution (LTE) or 5G network, user equipment (UE) may operate within one or more network coverage areas. These network coverage areas may be provided by one or more base stations, such as an evolved node B (eNB) and/or next generation node B (gNB), providing one or more overlapping network coverage areas. Mobile network service providers may strive to provide 100% coverage in certain markets, areas, zones, or other areas of interest. However, some geographic areas may offer insufficient network coverage or no network coverage at all. These geographic areas may result in UE experiencing inadequate network service, and ultimately poor user satisfaction. However, traditional techniques for identifying these geographic areas are ineffective for a variety of reasons.

For example, network planning tools may provide a 3D coverage analysis, but are frequently incomplete, and may not be available in all markets that an operator serves. In addition, mobile network operators may deploy testing vehicles to manually analyze signal quality at various points within the network coverage area. However, this labor-intensive approach is slow, expensive, and testing vehicles may be unable to access all locations, such as a building interior or other off-road location.

Mobile customers may also directly or indirectly provide mobile network operators with feedback regarding areas of poor or non-existent network service. However, receiving negative feedback from customers may reflect existing dissatisfaction with the service provided by the network operator, and the network operator may not receive negative feedback in a timely manner.

More recently, Observed Time Difference Of Arrival (OTDOA) techniques may be used at the location of UE, and may combine UE location positioning reference signals from a plurality of eNB cells with post-processing at an enhanced service mobile location center (eSMLC). However, OTDOA techniques do not identify coverage gaps since OTDOA does not function within network coverage areas served by a single cell.

Mobility Robustness Optimization (MRO) techniques are a 3GPP capability that optimizes mobility parameters by minimizing the number of handovers that occur either too early or too late. Although this a self-organizing network (SON)-related capability, MRO is insufficient to identify coverage holes or respond to gaps in coverage. Thus, there are currently limits for identifying geographic areas where coverage is poor or non-existent.

Certain embodiments of the present invention may have various benefits and/or advantages. For example, certain embodiments allow a wireless network operator to address service coverage gaps that impact UE and customer experiences. Thus, certain embodiments are directed to improvements in computer-related technology, specifically, by providing techniques for an operator to determine geographic regions of poor channel quality and/or no network coverage. Furthermore, certain embodiments allow network operators to adjust network coverage areas to minimize and/or eliminate service coverage gaps.

SUMMARY

In accordance with an embodiment, a method can include determining, at a network entity, a first distance between a first base station and a second base station based on a handover indication received from user equipment. The method can further include determining, by the network entity, a second distance between a point of signal loss and a point of signal acquisition of user equipment. The method can further include estimating, by the network entity, one or more network coverage areas based upon the first distance and the second distance. The method can further include reporting, by the network entity, the estimate to a network operator.

In accordance with an embodiment, an apparatus can include at least one processor and at least one memory including computer program code. The at least one memory and the computer program code can be configured to, with the at least one processor, cause the apparatus to at least determine a first distance between a first base station and a second base station based on a handover indication received from user equipment. The at least one memory and the computer program code can be further configured to, with the at least one processor, cause the apparatus to at least determine a second distance between a point of signal loss and a point of signal acquisition of user equipment. The at least one memory and the computer program code can be further configured to, with the at least one processor, cause the apparatus to at least estimate one or more network coverage areas based upon the first distance and the second distance. The at least one memory and the computer program code can be further configured to, with the at least one processor, cause the apparatus to at least report the estimate to a network operator.

In accordance with an embodiment, an apparatus can include means for determining a first distance between a first base station and a second base station based on a handover indication received from user equipment. The apparatus can further include means for determining a second distance between a point of signal loss and a point of signal acquisition of user equipment. The apparatus can further include means for estimating one or more network coverage areas based upon the first distance and the second distance. The apparatus can further include means for reporting the estimate to a network operator.

A non-transitory computer readable medium can, in certain embodiments, be encoded with instructions that, when executed in hardware, perform a process. The process can include a method that can determine, at a network entity, a first distance between a first base station and a second base station based on a handover indication received from user equipment. The method can further determine, by the network entity, a second distance between a point of signal loss and a point of signal acquisition of user equipment. The method can further estimate, by the network entity, one or more network coverage areas based upon the first distance and the second distance. The method can further report, by the network entity, the estimate to a network operator.

A computer program product can, according to certain embodiments, encode instructions for performing a process. The process can include a method that can determine, at a network entity, a first distance between a first base station and a second base station based on a handover indication received from user equipment. The method can further determine, by the network entity, a second distance between a point of signal loss and a point of signal acquisition of user equipment. The method can further estimate, by the network entity, one or more network coverage areas based upon the first distance and the second distance. The method can further report, by the network entity, the estimate to a network operator.

BRIEF DESCRIPTION OF THE DRAWINGS

For proper understanding of this disclosure, reference should be made to the accompanying drawings, wherein:

FIG. 5 illustrates an example of a method performed by a network entity according to certain embodiments.

DETAILED DESCRIPTION

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

By combining network-based coverage detection with UE-based coverage and geolocation feedback, a wireless network operator may be able to detect and identify network coverage gaps, allowing the network operator to proactively address service gaps that may impair the service provided to UE.

Figure 1:
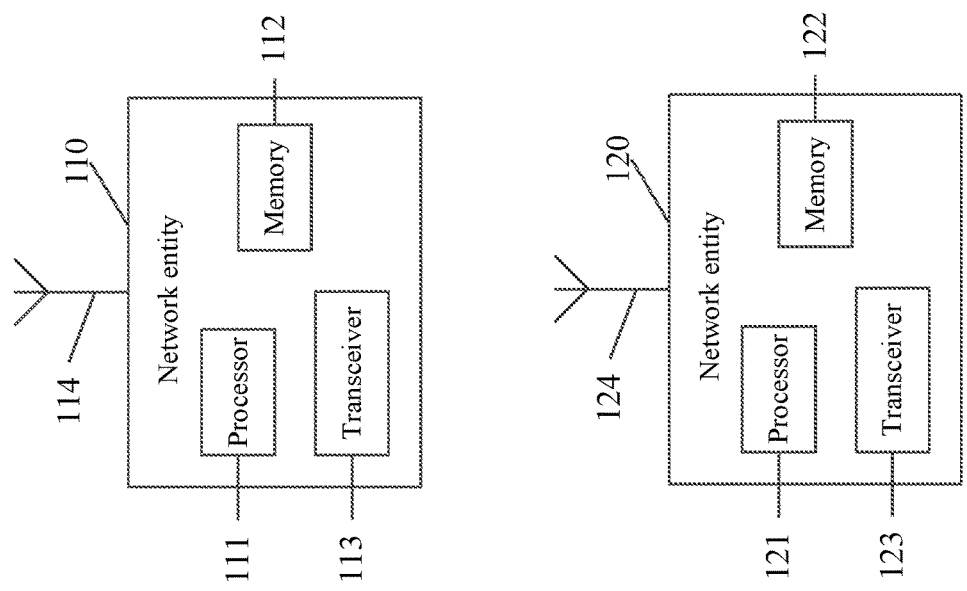
FIG. 1 illustrates an example of a system according to certain embodiments.

FIG. 1 illustrates a system according to certain embodiments. In one embodiment, a system may include multiple devices, such as, for example, network entity 110. Network entity 110 and 120 may include one or more user equipment. Network entity 110 and 120 may also include a next generation radio access network, mobility management entity, serving gateway, base station, such as an evolved node B (eNB), a server, and/or other access node.

One or more of these devices may include at least one processor, respectively indicated as 111 and 121. At least one memory may be provided in one or more of devices indicated at 112 and 122. The memory may be fixed or removable. The memory may include computer program instructions or computer code contained therein. Processors 111 and 121 and memories 112 and 122, or a subset thereof, may be configured to provide means corresponding to the various blocks of FIG. 5. Although not shown, the devices may also include positioning hardware, such as a global navigation satellite system (GNSS), global positioning system (GPS), and/or micro electrical mechanical system (MEMS) hardware, which may be used to determine a geographical location of the device. Other sensors are also permitted and may be included to determine location, elevation, orientation, and so forth, such as barometers, compasses, and the like.

As shown in FIG. 1, transceivers 113 and 123 may be provided, and one or more devices may also include at least one antenna, respectively illustrated as 114 and 124. One or more devices may have many antennas, such as an array of antennas configured for multiple input multiple output (MIMO) communications, or multiple antennas for multiple radio access technologies. Other configurations of these devices, for example, may be provided.

Transceivers 113 and 123 may be a transmitter, a receiver, or both a transmitter and a receiver, or a unit or device that may be configured both for transmission and reception.

Processors 111 and 121 may be embodied by any computational or data processing device, such as a central processing unit (CPU), application specific integrated circuit (ASIC), or comparable device. The processors may be implemented as a single controller, or a plurality of controllers or processors.

Memories 112 and 122 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as user equipment to perform any of the processes described below (see, for example, FIG. 5). Therefore, in certain embodiments, a non-transitory computer-readable medium may be encoded with computer instructions that, when executed in hardware, perform a process such as one of the processes described herein. Alternatively, certain embodiments may be performed entirely in hardware.

Figure 2:
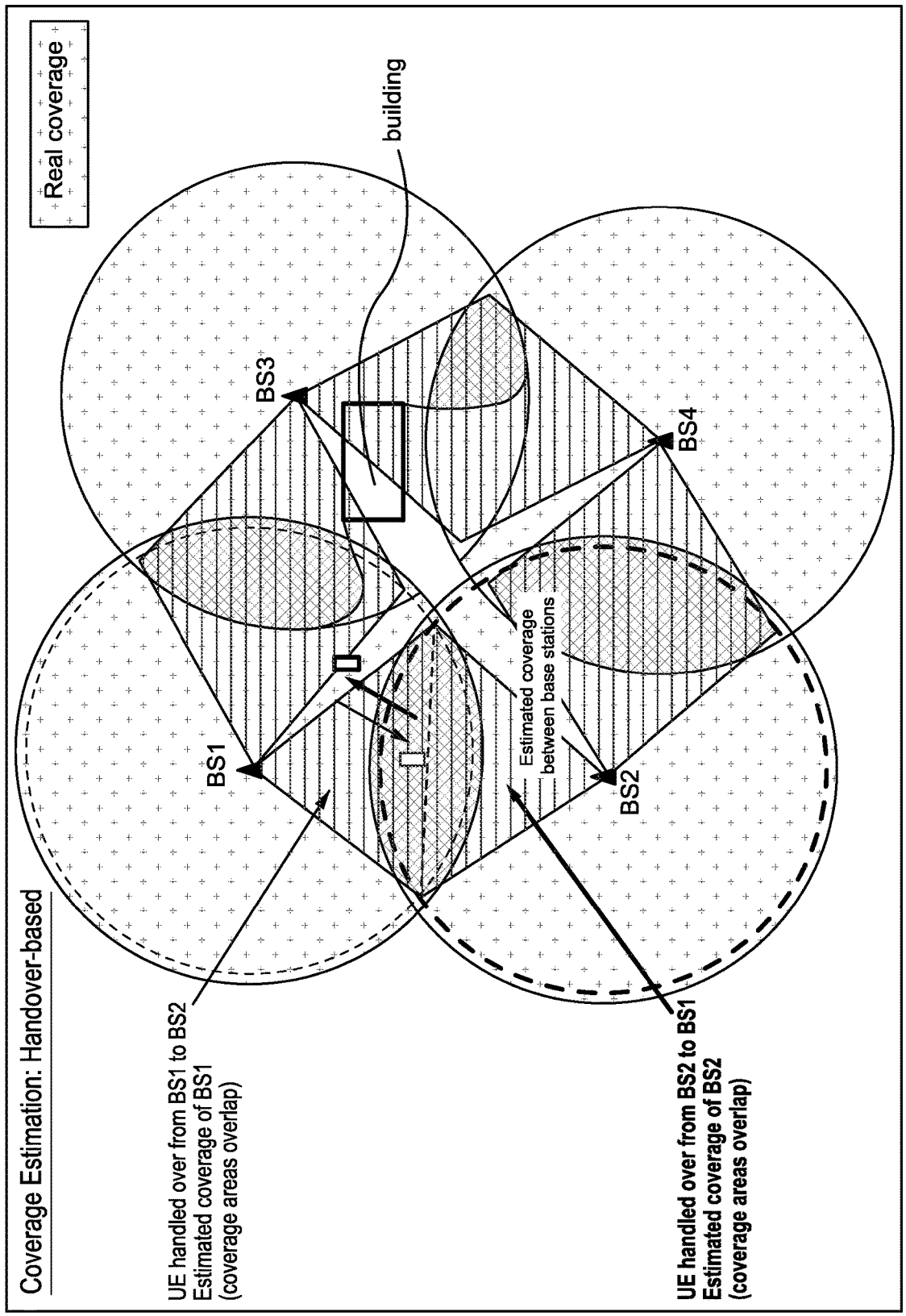
FIG. 2 illustrates another example of a system according to certain embodiments.

FIG. 2 illustrates a first handover of UE from a first base station to a second base station, and a second handover of UE from the second base station to the first base station.

In the example of FIG. 2, UE are configured to operate with base station 1 (BS 1), base station 2 (BS 2), base station 3 (BS 3), and/or base station 4 (BS 4), each of which may be an eNB and/or gNB. One or more BSs may broadcast one or more wireless signals that provide a network coverage area up to a certain radius from the center of the respective BS. In addition, some network coverage areas may overlap. For example, as illustrated in FIG. 2, the network coverage area of BS 1 partially overlaps with the network coverage areas of BS 2 and BS 3. Furthermore, the network coverage area of BS 4 partially overlaps with the network coverage areas of BS 2 and BS 3, but does not overlap at all with the network coverage area of BS 1.

In some embodiments, overlapping network coverage areas may form a certain geometric shape, such as a geometric lens. For example, a geometric lens may be a symmetric lens or an asymmetric lens. A geometric lens may be formed by a union of two circular areas that intersect and form two opposite ends of the geometric lens. For example, a geometric lens is formed by the union of the dotted circles around BS 1 and BS 2. In some embodiments, a symmetric lens may have a center formed lengthwise by a line connecting the two circular area intersection points. The area of a geometric lens may be defined as $A=R^2-(\theta-\sin\theta)$.

As further illustrated in FIG. 2, a geometric lens is depicted at each overlapping network coverage area. Furthermore, for each geometric lens, a quadrilateral region may also be formed between one or more BSs by connecting the opposite ends of the geometric lens with the locations of the corresponding one or more BSs. In some embodiments, a quadrilateral region may represent a high probability of reliable service in one or more service coverage areas.

As UE moves between network coverage areas provided by one or more BSs, a handover process may occur. For example, FIG. 2 illustrates UE moving from the network coverage area of BS 1 to the network coverage area of BS 2. UE may originate within the network coverage area of BS 1, but outside of the geometric lens. As UE moves into the geometric lens region of the network coverage area of BS 1, a handover process may occur to handover UE from BS 1 to BS 2. Similarly, UE may originate within the geometrical lens that is also within the network coverage area of BS 2. As UE moves to the network coverage area of BS 1 that is outside of the geometric lens, a handover process may occur to handover UE from BS 2 to BS 1.

In some embodiments, during a handover process, a network operator may use one or more handover processes to determine the maximum distance between one or more BSs. For example, as UE in FIG. 2 moves from the network coverage area of BS 1 to the network coverage area of BS 2, the handover process occurs at the distance represented by the dotted circle surrounding BS 1. Similarly, FIG. 2 also depicts UE moving from the network coverage area of BS 2 to the network coverage area of BS 1, where the distance that the handover occurs is illustrated by the dotted circle surrounding BS 2.

In some embodiments, the geographical position of BS 1 and BS 2 may be known to the network operator. For example, the geographical positions of one or more base stations may be associated with one or more latitude/longitude pairs and/or GPS coordinates.

In some embodiments, a maximum distance between one or more BSs and UE may be determined by one or more BSs and/or UE with timing advance techniques, such as using the time required for a signal to move between UE and one or more BSs. For example, one or more BSs may calculate the timing advance of UE continuously or according to a schedule, and may track and store the timing advance of each UE that operates within the network coverage area of the BS. As an example, a maximum distance between one or more BSs and UE may be determined by one or more BSs and/or UE based on timing advance techniques when a network coverage analyzer determines that UE has lost connection to a BS. In another example, one or more BSs may calculate a maximum distance between the BS and UE based on timing advance techniques when a network coverage analyzer determines that the BS should perform a handover process to handover UE to another BS, for example, when UE is leaving the network coverage area of the BS. In certain embodiments, one or more BSs may send corrections to UE.

In some embodiments, a maximum distance between one or more BSs and UE may be determined by one or more BSs and/or UE with geographical coordinates provided by a global navigation satellite system (GNSS), such as a global positioning system (GPS). In some embodiments, one or more BSs and/or UE may receive one or more signals from a GNSS that provides an indication of the geographical position of one or more BSs and/or UE. In some embodiments, a GNSS may provide signals indicating longitude/latitude/height coordinates, or other Cartesian coordinates. In one example, a maximum distance between one or more BSs and UE may be determined by one or more BSs and/or UE based on geographical coordinates when a network coverage analyzer determines that UE has lost connection to a BS. In another example, one or more BSs may calculate a maximum distance between the BS and UE based on geographical coordinates when a network coverage analyzer determines that the BS should perform a handover process to handover UE to another BS, for example, when UE is leaving the network coverage area of the BS. In some embodiments, the direction of UE movement may be determined by using geographical coordinates.

Figure 3:
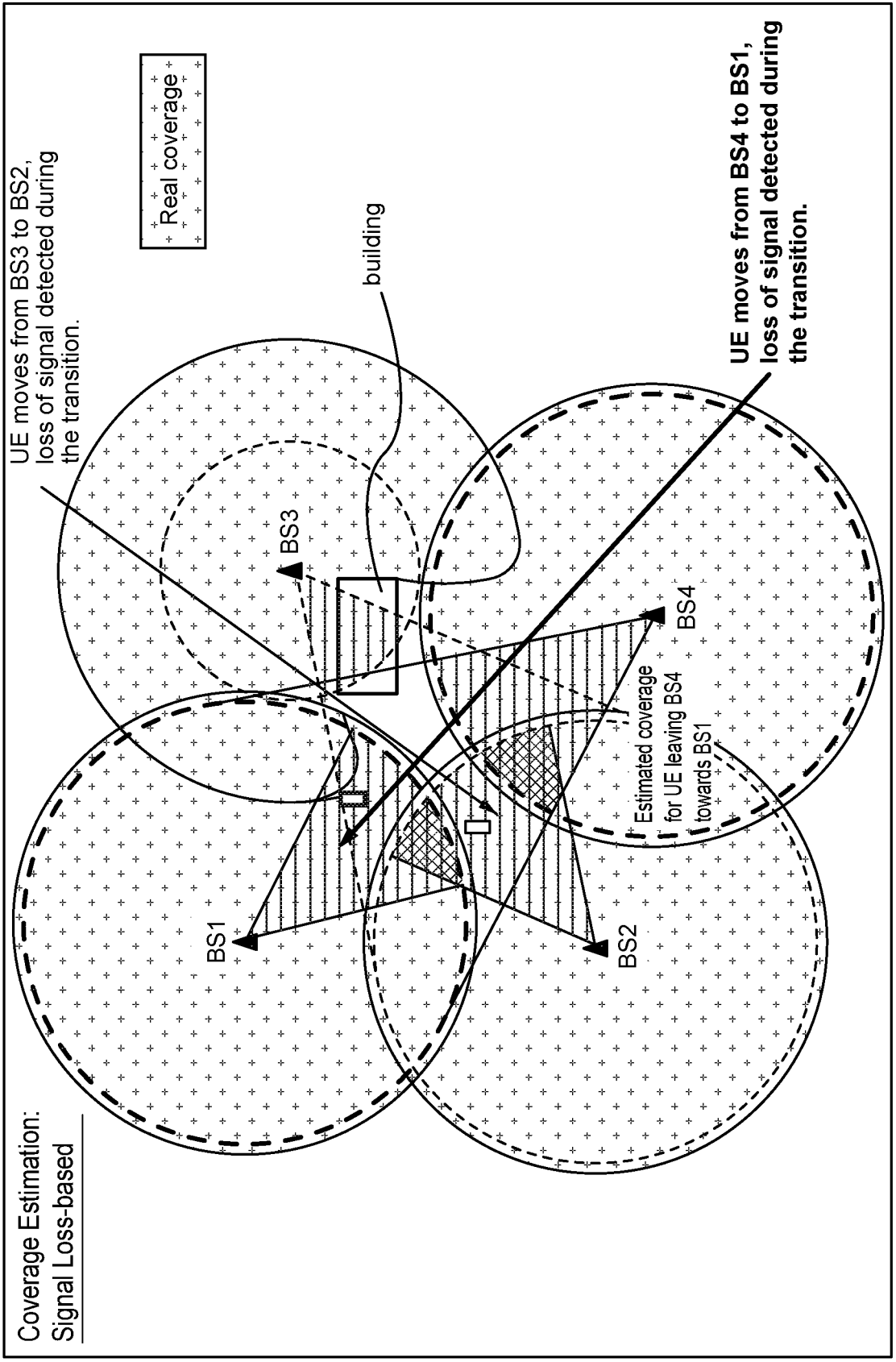
FIG. 3 illustrates another example of a system according to certain embodiments.

FIG. 3 illustrates an example system for signal loss-based coverage estimation. As illustrated in FIG. 3, UE may move from the network coverage area of BS 3 to BS 4. However, as UE moves between network coverage areas, UE may move through an area of no network coverage between the network coverage areas of BS 3 and BS 4, leaving UE without a signal to a BS. UE may eventually enter the network coverage area of BS 4, and provide location-based data to BS 4.

Using the location-based data from UE, the network operator may estimate the direction of UE movement. For example, the network operator may estimate the direction of movement of UE as illustrated by the arrows from BS 4 to BS 1, or BS 3 to BS 2.

For example, the system may estimate the distance away from BS 3 that that UE lost a signal to BS 3 after leaving the network coverage area of BS 3, as illustrated by the dotted circle around BS 3. In some embodiments, this estimated range may provide the network operator with an estimated circular network coverage area around BS 3.

Using the detected direction of movement by UE, the network operator may use the estimated network coverage area of BS 3 to calculate coverage based on the intersection of the estimated coverage area of BS 3 with a triangular area with vertices at the position of BS 3 and the edges of coverage around BS 2.

In some embodiments, timing advance measurements may be used to estimate the distance of UE from the base station, and to estimate the position of UE. In further embodiments, a channel quality indicator (CQI) may be used to estimate and identify areas of poor service coverage, and to detect when UE has exited one or more network coverage areas.

In some embodiments, a reference signal received power (RSRP) and/or reference signal received quality (RSRQ) measurement may be used to estimate and identify geographical areas of poor network service coverage, and/or to determine whether a loss of signal is due to a lack of network service coverage or a zone of high interference. In some embodiments, cell neighbor information (CNI) may be used to refine and modify an estimated position of UE. In some embodiments, network operators may use Doppler shift (DS) metrics to define and/or modify an estimated position of UE.

In some embodiments, UE may determine UE position, time of day, and/or last known cell, such as eNB. For example, these metrics may be determined when a CQI is reported at or below a certain threshold, during a radio link failure, and/or when a network connection is re-established. In some embodiments, UE may collect UE position, time of day, and/or last known cell, and transmit this data to a network operator when a network connection becomes available to UE. In some embodiments, UE position may be determined using GPS technology. In some embodiments, data reporting by UE may be achieved through a coverage analysis application provided by a network operator. In some embodiments, a network operator and/or a coverage analysis application may offer network coverage and/or signal quality maps to UE in exchange for UE providing network coverage statistics to the network operator.

In some embodiments, a direction of UE movement may be determined based upon information that one or more handovers were performed between one or more BSs and/or coordinates indicating the geographical location of one or more BSs. As an example, a network coverage analyzer may determine a direction of UE movement based on a line between the center geographical positions BSs.

In certain embodiments, a direction of UE movement may be determined based upon UE losing and acquiring a signal with one or more BSs. For example, a network coverage analyzer may determine a direction of UE movement based upon a line between BSs that lost a signal with UE and BSs that acquired a signal with UE.

In some embodiments, a direction of UE movement may be determined by one or more BSs and/or UE with geographical coordinates provided by a (GNSS), such as a GPS. In some embodiments, one or more BSs and/or UE may receive one or more signals from a GNSS that provides an indication of the geographical position of one or more BSs and/or UE. In some embodiments, a GNSS may provide signals indicating longitude/latitude/height coordinates, or other Cartesian coordinates. In one example, the direction of movement of UE may be determined by determining the distance between one or more sets of geographical coordinates.

Figure 4:
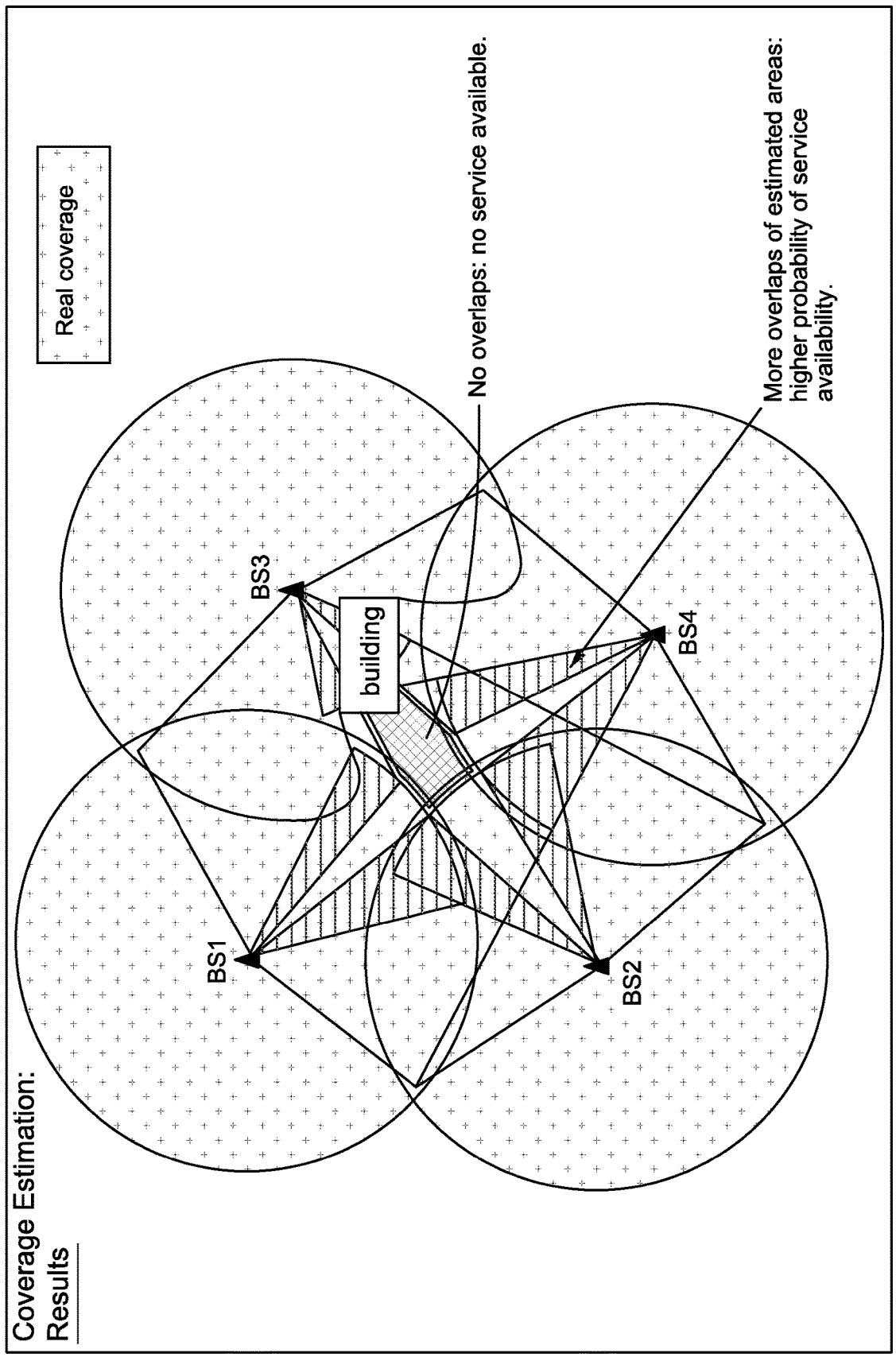
FIG. 4 illustrates another example of a system according to certain embodiments.

FIG. 4 illustrates a combination of a handover-based coverage estimation and signal-loss based estimation, such as those illustrated in FIGS. 2 and 3, respectively. In some embodiments, this estimation may provide a network operator with an indication of likelihood of service availability, with a degree of likelihood of reliable service related to the number of overlapping regions provided by the handover-based coverage estimation and signal-loss based estimation.

In some embodiments, areas with no overlapping areas, or areas with a number of overlapping areas fewer than a threshold number of overlapping areas, may indicate areas of low probability of service coverage. A network operator may examine these areas of low probability for further field measurements, and/or adjust the radius of a network service area provided by a BS.

In certain embodiments, handover-based coverage estimations may be used to identify network coverage deficiencies. For example, two or more handovers between a first BS and second BS may be used, with the first handover being from the first BS to the second BS, and the second handover being from the second BS to the first BS. As explained above in the discussion of FIG. 2, the distance of a UE from the first BS to the UE when the first BS hands over the UE to the second BS, the distance of a UE from the second BS to the UE when the second BS hands over the UE to the first BS, and the geographical positions of the first BS and second BS may form circular areas around each corresponding BS. A quadrilateral area may be formed between the intersections of these circular areas and the geographical positions of the first BS and second BS. In some embodiments, a quadrilateral area formed in this manner may represent a high probability of reliable service in one or more network coverage areas.

In some embodiments, signal-loss based estimations may be used to identify network coverage deficiencies. For example, UE may lose a signal with a first BS after leaving the network coverage area of the first BS, and may acquire a signal with a second BS after entering the network coverage of the second BS. Based upon the positions of the first BS and second BS, the direction of movement of UE may be estimated. In some embodiments, handover-based techniques may be used to estimate a distance that UE loses a signal to a BS, such as timing advance techniques described above. An estimated distance may generate a circular area of network coverage around a BS. Combining the circular area of network coverage of the first BS and the circular area of network coverage of the second BS may generate a combined network coverage area. For example, a triangular area of network coverage may be generated, with vertices as the geographical location of the first BS, and two points of tangency on the circular area of the second BS.

FIG. 5 illustrates an example method of a network entity detecting and defining network coverage deficiencies. In step 501, network entity 110 may determine a first distance between a first base station and a second base station based on a handover indication received from user equipment. In some embodiments, the distance between the first base station and the second base station may be a maximum distance. In some embodiments, network entity 110 may receive an indication of a first handover from a first base station to a second base station, and may receive an indication of a second handover from the second base station to the first base station. In some embodiments, the distance between the first base station and the second base station may be based upon one or more of timing advance, channel quality indicator, cell neighbor information, Doppler shift, and reference signal received power/reference signal received quality.

In step 503, network entity 110 may determine a second distance between a point of signal loss and a point of signal acquisition of user equipment. In some embodiments, network entity 110 may receive an indication of a signal loss and signal acquisition detected by user equipment, wherein the signal is acquired by user equipment. In some embodiments, network entity 110 may determine the second distance based upon one or more of GPS position, longitude/latitude, time of day, and/or last known cell. In some embodiments, a GPS position, longitude/latitude, time of day, and/or last known cell have been tracked by user equipment.

In step 505, network entity 110 may estimate one or more network coverage areas based upon the first distance and the second distance. In some embodiments, the estimating is based upon an aggregation of the first distance and the second distance.

In some embodiments, one or more mobile network operators may use the estimation of one or more network coverage areas to optimize one or more network coverage areas to minimize and/or eliminate service coverage gaps. For example, one or more mobile network operators may modify the physical location of one or more eNBs and/or gNBs. Additionally, one or more mobile network operators may modify one or more orientations of one or more antennas, such as the beam tilt, down-tilt, azimuth, and/or vertical plane radiation pattern of an antenna above or below a horizontal plane. In certain embodiments, one or more mobile network operators may add one or more cells, eNBs, and/or gNBs to one or more network coverage areas. In some embodiments, one or more mobile network operators may adjust handover configuration.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3 GPP 3rd Generation Partnership Project
BS Base Station
CNI Cell Neighbor Information
CQI Channel Quality Indicator
DL Downlink
DS Doppler Shift
eNB Evolved Node B
eSMLC Evolved Serving Mobile Location Center
GPS Global Positioning System
gNB Next Generation Node B
GNSS Global Navigation Satellite System
HO Handover
LTE Long-Term Evolution
MRO Mobility Robustness Optimization
OTDOA Observed Time Difference of Arrival
PRS Positioning Reference Signals
RF Radio Frequency
RLF Radio Link Failure
RSRP Reference Signal Received Power
RSRQ Reference Signal Received Quality
SON Self-Organizing Network
TA Timing Advance
UE User Equipment
UL Uplink

We claim:

1. A method, comprising:
    determining, at a network entity, a first distance between a first base station and a second base station based on a handover indication received from user equipment;
    determining, by the network entity, a second distance between a point of signal loss and a point of signal acquisition of user equipment;
    estimating, by the network entity, one or more network coverage areas based upon the first distance and the second distance; and
    reporting, by the network entity, the estimate to a network operator.

2. The method according to claim 1, wherein the estimating is based upon an aggregation of the first distance and the second distance.

3. The method according to claim 1, wherein the distance between the first base station and the second base station is a maximum distance.

4. The method according to claim 1, further comprising:
    receiving, by the network entity, an indication of a first handover from a first base station to a second base station; and
    receiving, by the network entity, an indication of a second handover from the second base station to the first base station.

5. The method according to claim 1, further comprising:
    receiving, by the network entity, an indication of a signal loss and signal acquisition detected by user equipment.

6. The method according to claim 1, wherein the signal is acquired by user equipment.

7. The method according to claim 1, wherein determining the distance between the first base station and the second base station is based upon one or more of timing advance, channel quality indicator, cell neighbor information, Doppler shift, and reference signal received power/reference signal received quality.

8. The method according to claim 1, wherein the network entity determines the second distance based upon one or more of GPS position, longitude/latitude, time of day, and/or last known cell, wherein a GPS position, longitude/latitude, time of day, and/or last known cell are received from user equipment.

9. The method according to claim 1, wherein UE tracks parameters in response to one or more of a cell quality indicator falling below a threshold, a radio link failure, and reestablishment of a network connection.

10. A non-transitory computer-readable medium encoding instructions that, when executed in hardware, perform a method according to claim 1.

11. A computer program product embodied in a non-transitory computer-readable medium and encoding instructions that, when executed in hardware, perform a process, the method according to claim 1.

12. An apparatus, comprising:
    at least one processor; and
    at least one memory including computer program code, wherein the at least one memory and the computer program code are configured to, with the at least one processor, cause the apparatus to at least:
    determining a first distance between a first base station and a second base station based on a handover indication received from user equipment;
    determining a second distance between a point of signal loss and a point of signal acquisition of user equipment;
    estimating one or more network coverage areas based upon the first distance and the second distance; and
    reporting the estimate to a network operator.

13. The apparatus according to claim 12, wherein the estimating is based upon an aggregation of the first distance and the second distance.

14. The apparatus according to claim 12, wherein the distance between the first base station and the second base station is a maximum distance.

15. The apparatus according to claim 12, further comprising:
    receiving an indication of a first handover from a first base station to a second base station; and
    receiving an indication of a second handover from the second base station to the first base station.

16. The apparatus according to claim 12, further comprising:
  receiving an indication of a signal loss and signal acquisition detected by user equipment.

17. The apparatus according to claim 12, wherein the signal is acquired by user equipment.

18. The apparatus according to claim 12, wherein determining the distance between the first base station and the second base station is based upon one or more of timing advance, channel quality indicator, cell neighbor information, Doppler shift, and reference signal received power/reference signal received quality.

19. The apparatus according to claim 12, wherein the network entity determines the second distance based upon one or more of GPS position, longitude/latitude, time of day, and/or last known cell, wherein a GPS position, longitude/latitude, time of day, and/or last known cell are received from user equipment.

20. The apparatus according to claim 12, wherein UE tracks parameters in response to one or more of a cell quality indicator falling below a threshold, a radio link failure, and reestablishment of a network connection.

* * * * *